Aug. 2, 1966                 H. A. SCHEIB               3,263,555
OPTICAL FILM PRINTER HAVING MEANS TO PRINT EDGE
NUMBERS WITHIN THE PICTURE AREA
Filed May 13, 1963                                            3 Sheets-Sheet 1

INVENTOR.
HAROLD A. SCHEIB
BY
Albert M. Herzig
ATTORNEY.

INVENTOR.
HAROLD A. SCHEIB
BY Albert M. Herzig
ATTORNEY.

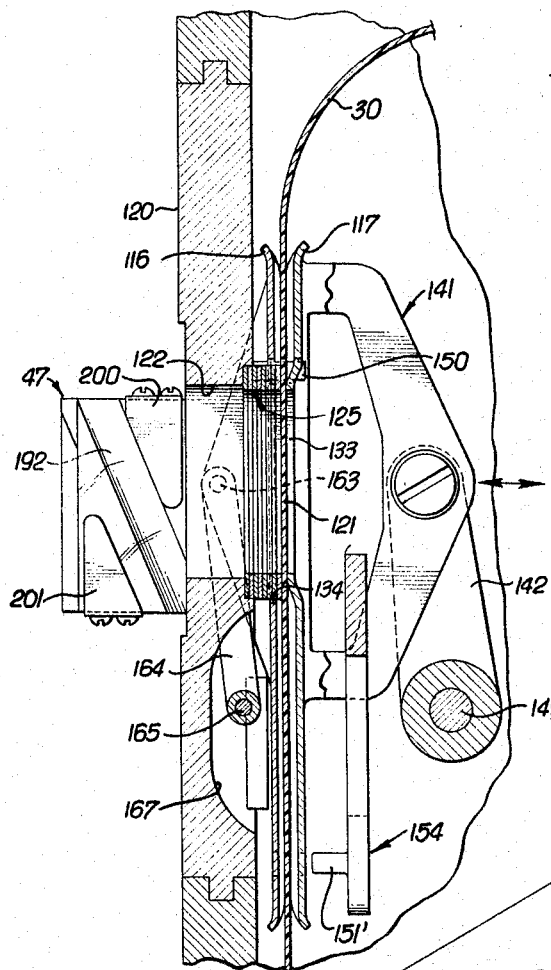
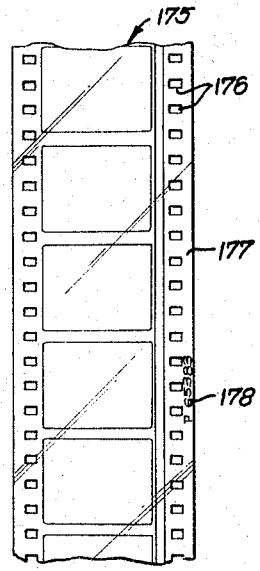
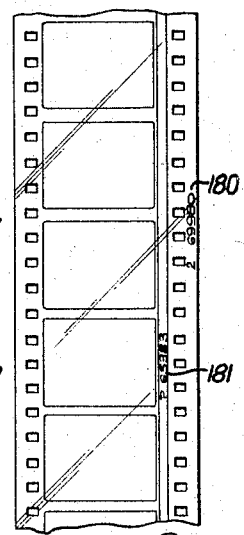
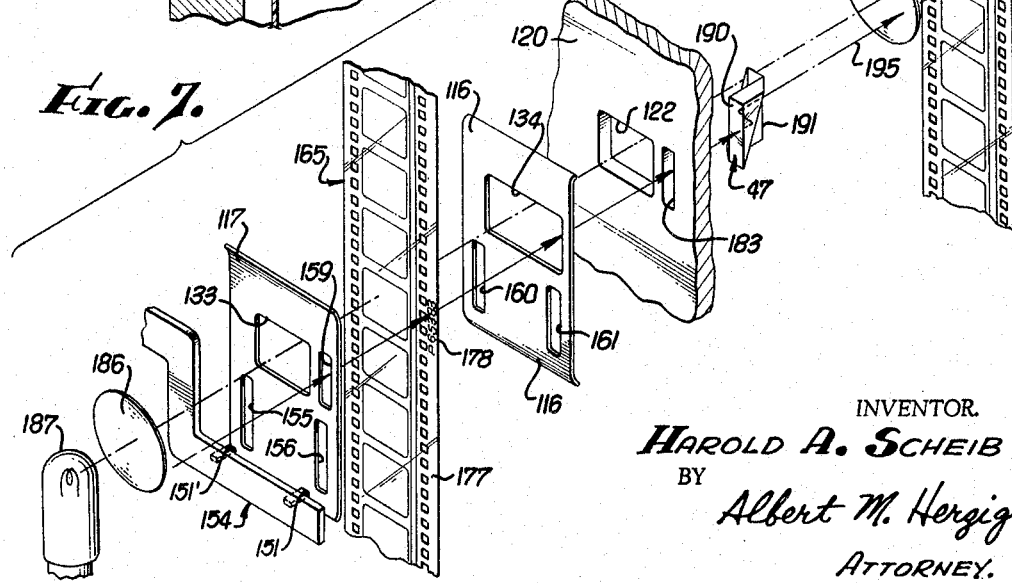
INVENTOR.
HAROLD A. SCHEIB
BY Albert M. Hergig
ATTORNEY.

United States Patent Office 3,263,555
Patented August 2, 1966

3,263,555
OPTICAL FILM PRINTER HAVING MEANS TO PRINT EDGE NUMBERS WITHIN THE PICTURE AREA
Harold A. Scheib, 4570 Gable Drive, Encino, Calif.
Filed May 13, 1963, Ser. No. 279,915
8 Claims. (Cl. 88—24)

This invention relates to an improvement in optical film printing machines. The improvement comprises a device or attachment combined with the machine whereby the edge key numbers on the original film are printed on the duplicate film within the picture area. There are very significant reasons for providing a device or means for accomplishing this purpose.

On the extreme outside edge of ordinary film there is a small area commonly known in the film industry as the edge numbering strip. The area inside the perforations or between the perforations is considered the picture area. The primary object of the invention is the concept and implementation thereof, of transferring the photographic information on either or both edge numbering strips to within the picture area between the sprocket holes, that is the perforations, when the film is optically printed. This is accomplished by taking the original film and printing it by means of an optical printer onto another piece of film in the manner described herein. The other piece of film is a negative or duplicate from which prints may be made. Normally, printing by means of known film printing machines reproduces only the picture image, the edge numbers being lost.

The herein invention provides a special type film transport referred to herein as a projector film movement, having means whereby the image of the edge numbering area may be displaced so that it will be reproduced within the picture area of the printed film. In a preferred form of the invention, a slot or slots are provided to expose the edge numbering area and by means preferably of a prism, mirror or optical system or a combination thereof, it is possible to print into or on what is commonly referred to as the sound track area of the film being printed, the edge numbers appearing on the original film. Thus, if the original film has an edge number on its extreme outside edge, it can be reproduced along with the picture image all entirely within the picture area between the perforations or sprocket holes of the new film. Contact prints made from the new or duplicate film will then also carry the original key numbers within the picture area as a permanent record.

The great advantage of the herein invention is that by means of it, key numbers may now be reproduced automatically on the printed film instead of it being necessary to manually transfer them into the sound track area as has previously been done. This results in a very significant time saving to film editors and others in matching any duplicate film back to the original by means of the key numbers which may now be photographically reproduced within the picture area. The purpose of the key numbers on the film is, of course, well known in the art as being necessary to identify the location of particular frames in the length of film.

The machine of this invention is additionally provided with an optical viewer whereby projected images may be viewed or observed. Also, a counter is provided preferably of a type that can initially be set to any desired number so that the number of frames exposed can be counted from that number. Since the edge numbers can be observed in the viewer accurate control of exposure of desired length of film is facilitated.

In addition to the foregoing stated objects, additional objects of the invention include the provision of particular, simplified, effective and easy to fabricate and maintain, attachments or means for accomplishing the objects stated. Further objects and additional advantages will become apparent from the following detailed description and annexed drawings wherein:

FIGURE 4 is a sectional view taken along the line 4—4 of FIGURE 2;

FIGURE 5 is a view of a piece of ordinary film showing the edge numbering strips with numbers on one of the strips;

FIGURE 6 is a view of a piece of printed film with the edge numbers printed within the picture area;

FIGURE 7 is an exploded view showing parts of the means or attachment of the invention whereby the edge numbers are printed within the picture area.

Figure 1:
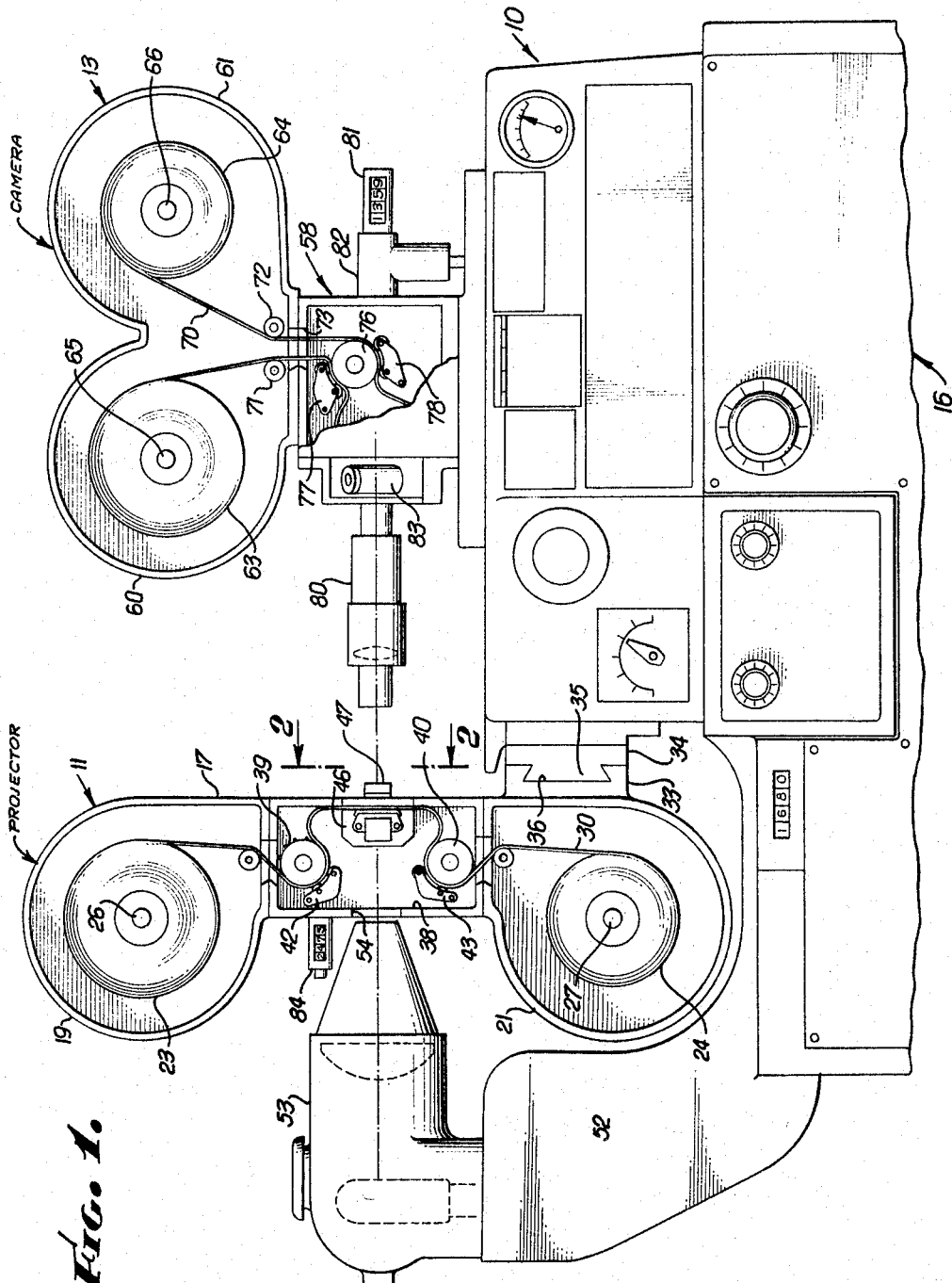
FIGURE 1 is a general view partly broken away of an optical film printing machine having the herein invention embodied therein.

Referring now in detail to FIGURE 1 of the drawings, this figure shows at 10 a commercially known type of optical film printer. These machines include a projector, as designated at 11, and a camera as designated generally at 13. The film to be printed or duplicated is run through the projector. The images are projected through a lens to the camera through which is being run the film on which the images are to be printed. The machine as shown in FIGURE 1 has embodied in it the means or attachment whereby the edge numbers of the film being projected are optically printed on the film going through the camera within the picture area.

The projector and camera are part of a cabinet designated generally at 16 embodying the necessary equipment which is part of the machine. For purposes of simplicity, the machine shown in FIGURE 1 is shown partly in schematic form.

In the machine shown, the projector comprises a housing or frame 17 having circular end parts 19 and 21 providing housings for film reels 23 and 24, on spindles 26 and 27. The film to be printed is designated at 30. The projector housing is removably mounted to the cabinet or housing 16 by way of members 33 and 34, the member 34 having a dove tailed part 36 which engages in a similarly shaped channel 36 in the part 33.

The housing 17 has an intermediate enclosure part 38 having in it sprocket wheels 39 and 40 over which the film passes, as shown. The film is guided and held against the sprocket wheels by rollers mounted in brackets as designated at 42 and 43. The film passes between pressure plates suitably supported from brackets in the housing 38, as designated at 46 and as will be described in more detail presently. Numeral 47 designates a prism by means of which the images of the edge numbers are displaced, as desired, and as will be described more in detail presently.

The cabinet of the machine includes an extending frame part 52 on which is mounted an enclosure 53 for a light source whereby a beam of light is projected through an opening 54 and through the film being printed.

The camera 13 is especially designed for optical printing. It includes a housing or cabinet 58 on the top of which is a housing having arcuate or circular parts 60 and 61 having film reels therein, 63 and 64 on spindles 65 and 66. The film is designated at 70. It engages guide rollers 71 and 72 adjacent an opening 73 through which the film passes into and out of the cabinet 58. The film engages a sprocket wheel 76 in the housing 58 and is guided by and held in engagement with the sprocket wheel by means of rollers mounted on brackets 77 and 78.

At the front part of the camera is a cylindrical housing 80 having in it suitable lenses whereby the images are reflected into the camera for reproduction on the film strip. A counter, as designated at 81, is provided extending from a housing 82 for counting the footage of film strip that is printed. Numeral 83 is an optical viewer whereby the images being printed can be observed for purposes of centering, etc. Numeral 84 designates a counter of the type which can be set to a given number and will then indicate progressively as frames are exposed from that number. The edge numbers on the images are visible in the viewer.

The cabinet 16 contains appropriate equipment and control for controlling and regulating both the projector and the camera. The camera is especially designed for optical printing. It may have a dissolving shutter, if desired, with an automatic fade and such conveniences as an automatic takeup and an anti-buckle switch. The lens may be a type that is color corrected and designed for printing work. The lens mount may have dial indicators to indicate the moves, both horizontally and vertically in small fractions of an inch. The machine may have a rewind which is electrically controlled so that when a lever is moved in either direction, the machine will go either forward or reverse. This lever may also control the speed up to sixty feet per minute, for example. Selective switches may be provided indicating frames from 1 to 16 and by using this system it is possible to predeterminately start or stop the projector, stop the camera or stop both the projector and camera at any predetermined frame. These controls are indicated schematically on the front of the cabinet 16. They are part of the commercial equipment and do not require further detailed description.

Figure 2:
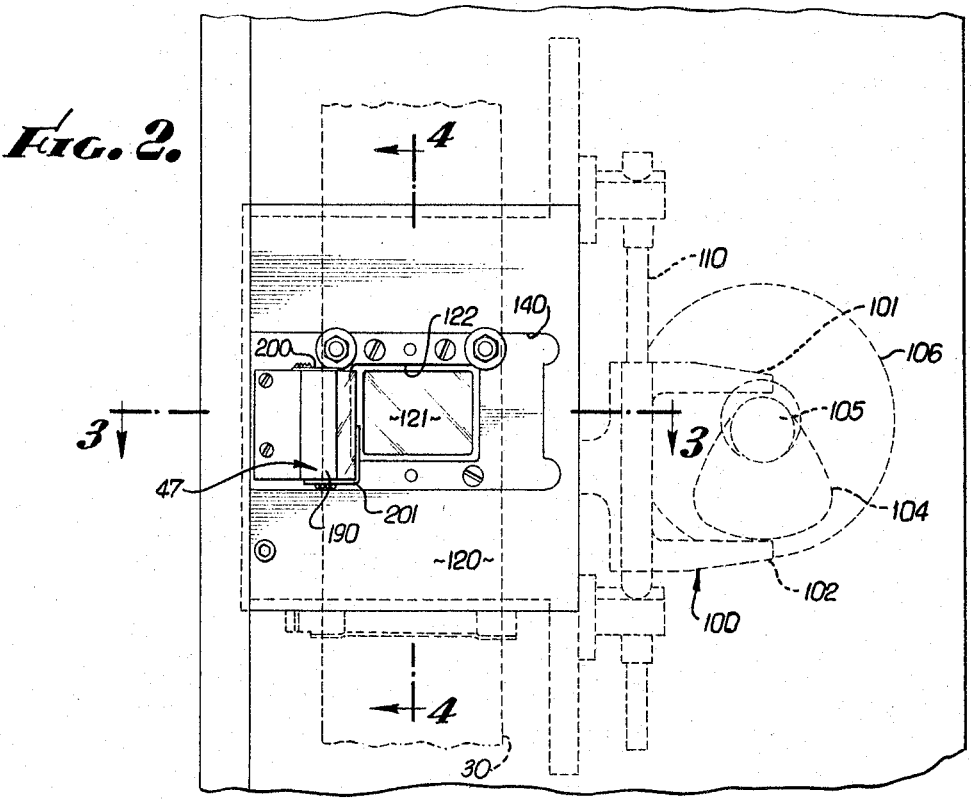
FIGURE 2 is a view taken along the line 2—2 of FIGURE 1.

Referring now in more detail to the means whereby the purposes of the invention are accomplished, FIGURE 2 is a front view of the intermediate part of the projector. The film transport unit is a movable assembly comprising pressure plates between which the film passes adjacent to an opening or aperture through which the beam of light passes for transferring the images to the camera. This assembly is connected to an extending yoke shown in outline at 100 and having extending arms 101 and 102 between which is positioned a cam 104 having a single lobe, as shown. This cam is on a shaft 105 which is driven at a suitable speed for advancing the film as will be described. The yoke 100 has a vertical bore and it is mounted on a vertical stem 110 shown in outline and supported from the housing or frame 38.

Figure 3:
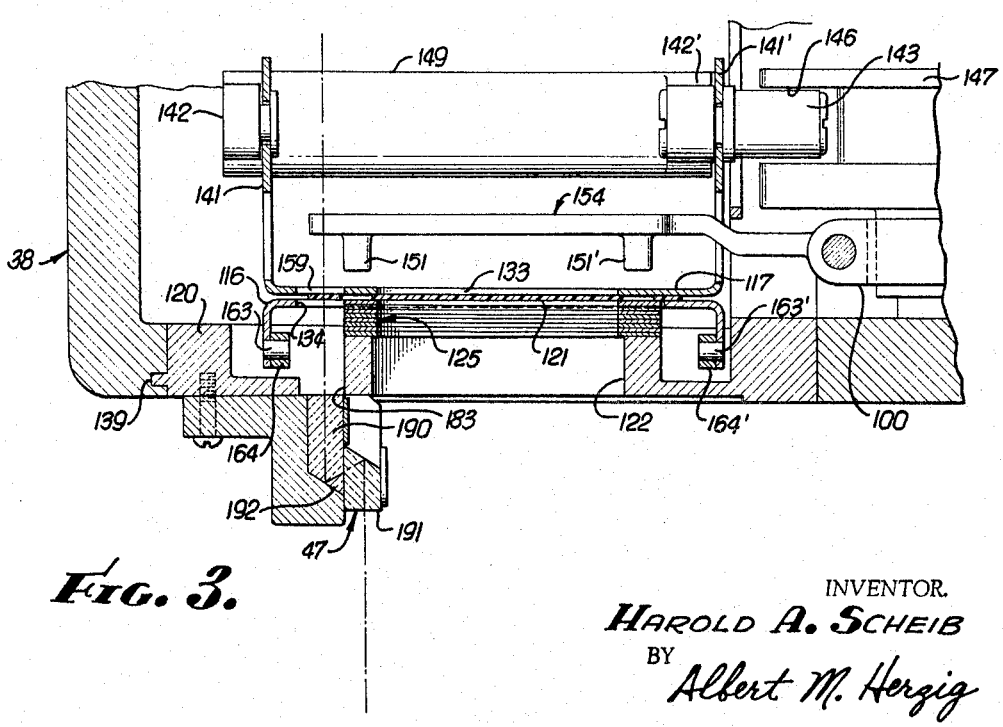
FIGURE 3 is a sectional view taken along the line 3—3 of FIGURE 2.

The film 30, as shown in FIGURE 4, passes between movable pressure plates 116 and 117 which are positioned inside the front wall 120 of the housing 38. The part of the film that is projected is designated at 121 being opposite an opening or aperture 122 in the front wall 120. Around the inside of this opening is a laminated frame member, as designated at 125. The pressure plates have similar openings 133 and 134 to allow the passage of the beam of light therethrough by which the images are projected. See FIGURE 7. The front wall portion 120 is in the form of an insert in the front part of the frame 38 as may be seen in FIGURE 3, these parts having interfitting relationship by way of a tongue and groove joint as designated at 139. Numeral 140 designates a cut-out or recess around the aperture which may receive a masking member. See FIGURE 2.

The film transport unit is like conventional film movements except as described hereinafter. The movement of this invention is constructed so as to accommodate itself to transferring the images of the edge key numbers from the film being projected into the picture area of the film being printed.

The film movement operates to advance the film one frame at a time, each frame being momentarily stopped when it is exposed for a time corresponding to the shutter speed.

The film movement comprising the spaced pressure plates 116 and 117 between which the film 30 passes, is movable in a direction toward and away from the wall or panel 120 during the advancing operation of the film. The inner pressure plate 117 is mounted on a pair of yokes as designated at 141 and 141'. These yokes are pivotally attached to link members 142 and 142' which support the inner pressure plate 117. This yoke assembly is actuatable by a stem having extending pin 143 on it which engages in a slot 146 in a cam 147 which is driven at a suitable projecting speed coordinated with the shutter speed. The cam slot 146 in the cam 147 is such as to actuate the pin 143 to move the pressure plate assembly towards and away from the aperture. The links 142 and 142' are attached to a transverse rotatable member 149 to provide for parallel motion of the pressure plate assembly.

During exposure, the film sprocket holes or side perforations engage a pair of pins, one of which is shown at 150 in FIGURE 4, which extend inwardly from the frame 125 so that the film is held in a stopped position momentarily during exposure. The pressure plate assembly then moves inwardly with respect to the panel 120 disengaging the film from the pins 150 and the sprocket holes are brought into engagement with a pair of pins 151 and 151' mounted on the lower part of a carrier 154 which is in a position on the inner side of the pressure plate 117. The carrier 154 is in the shape of a yoke having downwardly extending legs having the extending pins on them. These pins operate in slots 155 and 156 in the pressure plate 117 spaced below the aperture 133, and slot 159 is for the image of the edge key numbers. Pressure plate 116 has slots 160 and 161 to accommodate pins 151 and 151'.

The supports for the pressure plate assembly form a parallel motion linkage so that this assembly can move in an inward and outward direction in a straight line. The pressure plate 116 has outwardly extending webs shown in outline in FIGURE 4 which extend into recesses in the panel 120 and are attached to pivot members 163 and 163' which are in turn connected to links 164 and 164'. These links are pivoted to pivot members 165 and 165' attached within a recess 167 on the inside of the panel 120. As may be seen, therefore, the cam 147 operates to move the pressure plate assembly inwardly and outwardly in synchronism with the operation of the shutter.

The carrier 154 is operated by the previously described yoke 100 driven by the cam 104. The film may be driven in either direction. When the pressure plate assembly is moved inwardly disengaging the film from the pins 150, the pins 151 and 151' move in through the slots in plate 117 and engage the perforations or sprocket holes in the film. The carrier 154 is then moved by the yoke 100 and cam 104 in a direction to move the film in the desired direction while the pressure plate assembly is in the inward position. The pressure plate assembly then moves in the outward direction re-engaging the sprocket holes in the film with the pins 150 and the carrier 154 moves back to its original position. These movements are repeated cyclically so that the film is driven at a desired speed with the film being momentarily stopped for each exposure.

The invention provides means, as stated above, whereby the edge key numbers may be displaced or transferred so as to be printed within the picture area of the printed film. FIGURE 5 designates at 175 a conventional film strip having frames and edge perforations or speocket holes 176. The edge numbering strip is designated at 177 having an edge key number 178 printed or inscribed thereon as shown. FIGURE 6 designates a piece of printed film or duplicate optically printed by the mechanism of this invention. This piece of film has a key number in the outside edge strip 180, as shown, but it also has the edge key number shown in the strip of FIGURE 5 printed thereon within the picture area, as designated at 181. The means of this invention are able to cause the edge key number 178 of the strip 175 to be printed in the position shown in 181 in FIGURE 6.

FIGURE 7 is an exploded view showing parts of the film transport or projector film movement whereby the object described is realized. The panel 120 is provided with a slot 183 of a size to have images of the edge numbers 178 passed therethrough. The pressure plate 117 is provided with slot 159 to allow the images of the edge numbers to pass through. The projector lens is designated diagrammatically at 186 and the projector light source at 187. The camera lens 80 is diagrammatically shown in FIGURE 7. Numeral 47 designates the glass prism which is mounted on the outside of the panel 120 so as to be in the path of light and images passing through the slots 159 and 183 and the aperture 134. That is, the prism 47 is aligned with light passing through the edge strip 177 having the edge key numbers 178 thereon. The prism 47 has an incident portion 190 and an inwardly displaced portion 191 and an intermediate inclined portion 192, as may be seen in FIGURE 4. That is, the configuration of the prism is such that it displaces the rays of light inwardly to a line designated at 195 in FIGURE 7 and it also displaces the rays slightly in a vertical plane. The displacement of the light rays by the prism is such that the image of the edge key numbers at 178 in the film being printed are displaced to a position of designated at 181 in FIGURES 6 and 7 in the picture area, that is to a position as desired on the printed duplicate film and on the contact prints to be made from it. The prism 47 is held in place by brackets 200 and 201. See FIGURE 4.

From the foregoing it will be observed that the invention provides a special film transport or projector film movement whereby film can be automatically optically printed by the machine with the edge numbers of the original film being transferred or transposed so as to be duplicated within the picture area of the printed film rather than along the edge strip thereof. In this manner the significant advantage previously referred to is realized that the edge key numbers are reproduced automatically on the printed film making it unnecessary for them to be manually transferred to the sound track area as has been previously done. The edge key numbers appear on the film when printed and there is a great saving in time to film editors and others in matching any duplicate film back to the original by means of the key numbers.

The counter 84 is connected to the projector so as to register one count for each frame that is exposed. This is a standard commercial form of counter which can be initially set to any desired number, corresponding to some particular edge key number on the film being projected. The operator, by viewing the images projected through the viewer 83 can at any time see what edge number is being projected and can set the counter 84 accordingly. The counter will indicate the number of frames from the original setting. In this manner, any section of film between any two edge key numbers can be very readily projected merely by using the viewer and setting the counter 84 and projecting from a number set on the counter to an edge key number representing the end part of the section it is desired to print.

The herein invention is of great advantage as may be observed since it makes it unnecessary to prepare work prints having recorded thereon the edge numbers of sections of film that are to be printed and reproduced. Ordinarily when sections of film are to be printed or otherwise redone, the technician must prepare a work print with the edge numbers identified thereon and match it with the original film and he must inscribe the corresponding edge key numbers from the film onto the work print. With the herein invention, the edge key numbers are printed within the picture area of the original negative and the master positive, both of which display the original key numbers and also the printed key number within the picture area. Both show together on the prints and this greatly facilitates and simplifies the work of matching up with the original film because the technician has a print with the edge key numbers within the picture area which he can match up with the edge numbers of the original film. The arrangement also facilitates the work of the negative cutter.

While the invention is primarily for the purpose of printing edge key numbers within the picture area, it serves the same purpose with respect to any edge indicia such as timing blips, etc. These are timing marks used with high speed cameras to determine the camera speed.

With respect to the prism, it could of course be associated with the camera as well as the projector.

The prism accurately displaces the image of the edge key number in a vertical direction. This may be accurately, a distance of one sprocket hole. This vertical displacement is necessary to accommodate to the position of one of the pins 150 which would be in the way if means were not provided for the vertical displacement as described.

From the foregoing, those skilled in the art will observe that the invention as described herein achieves and realizes all of the objects and advantages as stated in the foregoing, as well as having any additional advantages which are apparent from the detailed description.

The foregoing disclosure is representative of a preferred form of the invention and is to be interpreted in an illustrative rather than a limiting sense, the invention to be accorded the full scope of the claims appended hereto.

What is claimed is:

1. An optical film printing machine comprising a projector and a camera arranged for projecting images of a film having edge indicia outside the picture area by the projector, and optically printing them by the camera on a second sensitized film, the improvements comprising means for projecting the said edge indicia outside of the picture area of the film being projected so that they are reproduced by the camera within the picture area of the sensitized printed film.

2. A device as in claim 1 wherein said last means comprises an attachment for displacing images of the edge indicia of the printed film inwardly from the edge of the film an amount to cause them to be reproduced by the camera on the printed film within the picture area thereof.

3. A device as in claim 2 wherein said attachment comprises a prism positioned so that light rays passing through that part of the film having the edge indicia thereon pass through the prism, said prism being constructed to displace said light rays inwardly an amount sufficient to cause said images to be reproduced on the printed film within the printed area.

4. A device as in claim 3 wherein said prism comprises a first portion and an inwardly displaced portion and an intermediate portion whereby light rays entering the first portion of the prism are displaced inwardly to a predetermined inward parallel position whereby images of the edge indicia are reproduced within the picture area of the printed film.

5. An optical film printing machine comprising a projector and a camera arranged for projecting images of a film having edge indicia outside the picture area by the projector, and optically printing them by the camera on a sensitized film, said projector having a film transport unit cooperating with an aperture for projecting individual frames of film, said transport unit comprising means for advancing the film so as to expose individual frames, said means comprising pressure plate means for holding the film, said projector having additional aperture means whereby the image of film edge indicia outside the picture area can be projected, said film advancing means comprising a member having projections engageable with the film perforations for advancing the film and said pressure plate means including a pressure plate having openings therein to accommodate said projections, said openings being spaced from said additional aperture means, and means associated with the projector whereby the images of the edge indicia are projected so as to be photographed within the picture area of the sensitized printed film.

6. A device as in claim 5 wherein said last means comprises prism means associated with said additional aperture means whereby to displace the image of the edge indicia projected so as to cause them to be printed within the picture area of the film being printed.

7. An optical film printing machine comprising a projector and a camera arranged for projecting images from a film by a projector and optically printing them by the camera, means for projecting edge key numbers of the film so that they are reproduced by the camera within the picture area of the printed film, viewer means for optically viewing the images being projected and said projector being provided with an indicating counter whereby edge key numbers optically visible through the viewer can be coordinated with a number registered by said counter.

8. A device as in claim 7 wherein the said counter is of a type capable of being initially set to a predetermined number so as to indicate the number of frames exposed starting from that number.

References Cited by the Examiner

UNITED STATES PATENTS

| | | | |
|---|---|---|---|
| 2,169,011 | 8/1939 | Wengel | 352—90 |
| 2,490,338 | 12/1949 | Marin et al. | 95—1.1 |
| 2,868,064 | 1/1959 | Henkel | 352—326 X |

NORTON ANSHER, *Primary Examiner.*

EVON C. BLUNK, *Examiner.*

R. A. WINTERCORN, *Assistant Examiner.*